Aug. 11, 1931.  J. L. GREEN  1,818,476
OIL PURIFIER
Filed May 31, 1930  2 Sheets-Sheet 1

J. L. Green,
INVENTOR
BY Victor J. Evans
ATTORNEY

Aug. 11, 1931.  J. L. GREEN  1,818,476
OIL PURIFIER
Filed May 31, 1930   2 Sheets-Sheet 2
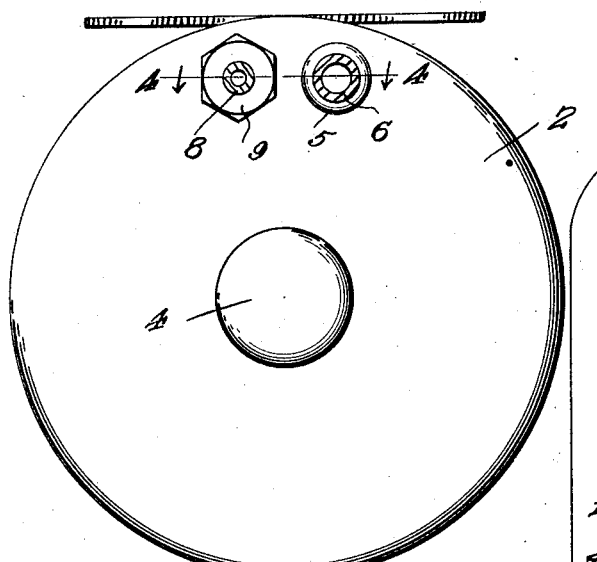
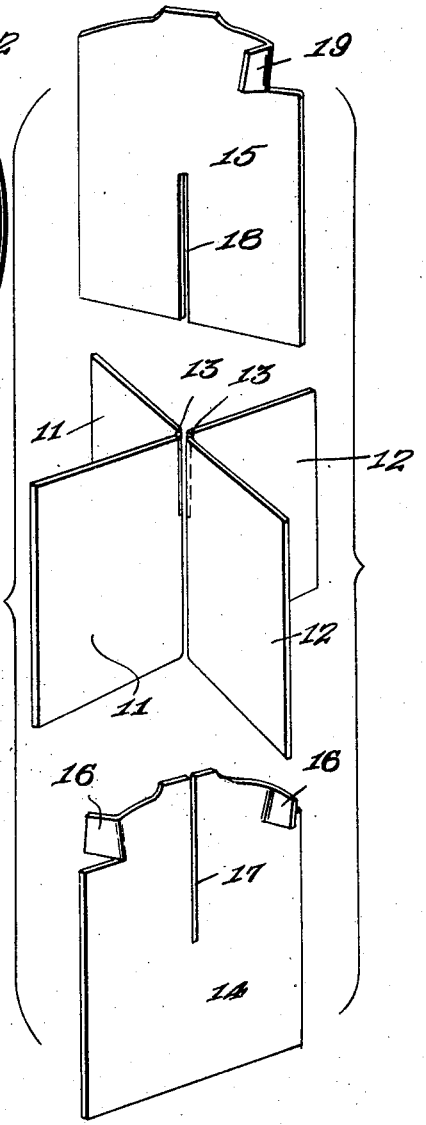
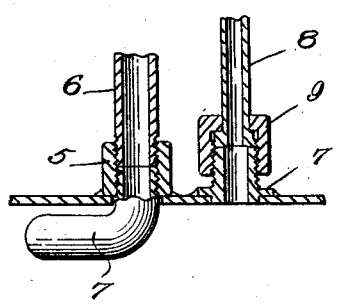
J. L. Green, INVENTOR
BY Victor J. Evans
ATTORNEY Patented Aug. 11, 1931

1,818,476

UNITED STATES PATENT OFFICE

JOHN L. GREEN, OF EL DORADO, ARKANSAS

OIL PURIFIER

Application filed May 31, 1930. Serial No. 458,604.

My present invention has reference to internal combustion engines and my object is the provision of a device for insuring clean oil in the crank case of such engines, so as to protect the bearings from dirt, grit and other extraneous matter.

A further object is the provision of means for supplying clean oil to the motor in such manner as to retain the efficiency of the oil.

A further object is the provision of a novel form of oil cleaner or purifier in which a series of baffle plates are arranged in the path of the oil, so spaced as to cause dirt, grit, carbon and other foreign substance to be diverted from the direct flow of oil.

A still further object is the provision of an oil purifier for this purpose that is designed to remain a permanent part of the automobile, automatic in use, practically indestructible and which is also of an extremely simple nature and construction.

To the attainment of the foregoing the invention consists in certain other novel features of construction, combination and operative association of parts, one satisfactory embodiment of which is disclosed by the accompanying drawings.

In the drawings:

Figure 3 is a plan view.

Figure 4 is a detail sectional view approximately on the line 4—4 of Figure 3.

Figure 5 is a perspective view of the elements constituting the baffle plates.

Figure 1:
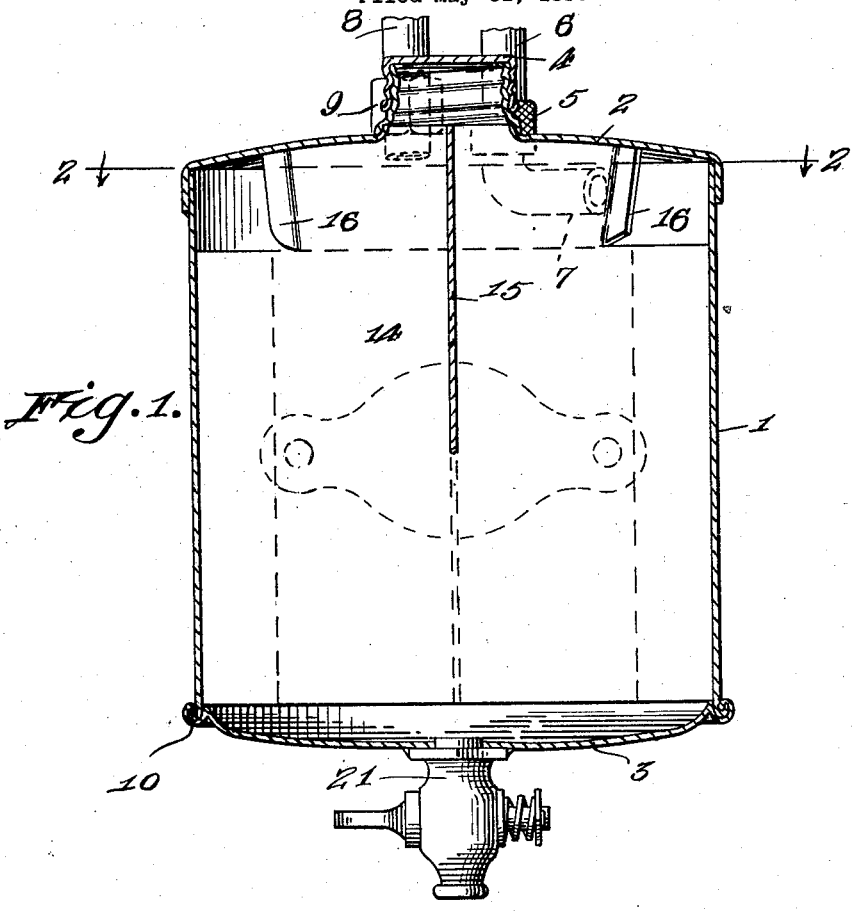
Figure 1 is a substantially vertical longitudinal sectional view through the improvement.
Figure 2:
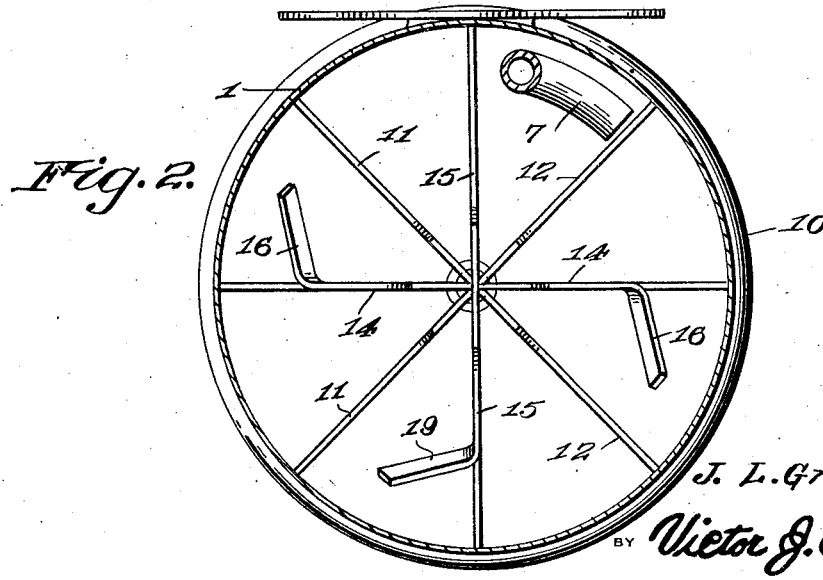
Figure 2 is a sectional view approximately on the line 2—2 of Figure 1.

In the oil feed line of an internal combustion engine I arrange a preferably cylindrical casing 1. The casing 1 has a removable outwardly rounded or dome-shaped top 2 and an outwardly rounded bottom 3. The top 2 is preferably formed with a central opening surrounded by an outstanding threaded neck on which is screwed a cap 4. This permits of an inspection of the interior of the casing.

The oil inlet pipe, which is screwed in an interiorly threaded boss 5 at the top of the cap 2 is indicated by the numeral 6 and this inlet pipe terminates in a curved or angularly disposed substantially L-shaped extension or nozzle 7 which is preferably of a separate element and is screwed in the boss 5.

Opposite the boss 5 the top or cap 2 is formed with an exteriorly threaded hollow boss 7 that is contacted by the flanged end of the oil outlet pipe 8, the said pipe being secured on the flange by a packing nut 9.

In the casing 1 and resting on the ledge or flange 10 between the body and the outwardly rounded bottom 3 thereof there are any desired number of angularly arranged baffle plates, all of the plates contacting with the inner wall of the casing. As disclosed by Figure 5 of the drawings two of the plates are preferably bent angularly in a line with the center thereof to provide what I will term wings 11—11 and 12—12, respectively. From their upper ends the plates providing the wings 11 and 12 are slotted longitudinally in a line with the juncture of the said wings, as indicated by the numeral 13, respectively. The remaining baffle plates are in the nature of straight members, one of which is indicated by the numeral 14 and the other by the numeral 15. The baffle plates 14 and 15 are of a greater length than the wings or baffle plates 11 and 12. The baffle plate 14, adjacent to the top thereof and at a point parallel to the upper edges of the baffle plates or wings 11 and 12, is slitted transversely and the metal bound by these slits is bent angularly over the opposite faces of the plate 14. These bent portions are in the nature of deflectors and are indicated by the numeral 16. The upper edge of the plate 14, inward of the deflector flanges 16, is rounded so that the same will snugly contact with the outwardly rounded top or cap 2 of the casing and the said baffle plate 14 from its said upper edge is slitted longitudinally, as at 17, for a determined distance and whereby the said slit or slot will receive therein the wings 11 and 12 at the angle juncture of such wings.

The baffle plate 15, from its lower edge, is centrally slotted longitudinally, as at 18, whereby the same can be passed through the slots 13 and 17 and engage with the baffle plate 14 and with the baffle plates or wings 11 and 12 at the juncture or connecting point between such wings or plates 11 and 12. The baffle plate 15 is of a length corresponding to that of the baffle plate 14 and has one of its edges from a point adjacent its upper corner slitted transversely and the metal bound by the slit bent angularly over one of the faces of the plate 15 to provide a deflector flange 19 similar to the deflector flanges 16. The upper edge of the plate 15 is rounded so that the same will snugly contact with the inner face of the cap or closure 2.

The casing 1 has fixed on one of its sides a plate or bracket, whereby the same may be secured to a suitable support.

In operation the oil flows through the inlet pipe 6 and through the nozzle 7. It is to be noted that the nozzle has its outer mouth arranged in a line with one of the deflector flanges 16 or 19. The oil contacting with this flange will impart a whirling movement in a circular direction to the oil in the casing 1, such movement of the oil bringing the same against the deflector flanges 16 and 19 and likewise over the upper edges of the wings or deflectors 11 and 12 and also over the outer edges of the deflector plates 14 and 15 inward of the deflector flanges 16 and 19 thereon so that all impurities in the oil will be diverted from the top or level of the oil and precipitate between the baffle plates onto the bottom 3 of the casing. Thus the oil is cleaned and purified before finding an outlet through the pipe 8. The bottom 3 of the casing is provided with a hand operated cock or valve 21 whereby sediment may be removed from the casing at predetermined intervals.

It is believed the foregoing description when read in connection with the accompanying drawings will fully set forth the construction and advantages of the improvement to those skilled in the art to which such invention relates without further detailed description but obviously I do not wish to be restricted to the precise details herein set forth and, therefore, hold myself entitled to make such changes therefrom as fairly fall within the scope of what I claim.

Having described the invention, I claim:

1. An oil cleanser and purifier comprising a casing having an oil inlet pipe and an oil outlet pipe in the top thereof, baffle plates of different lengths in the casing, the longer baffle plates having their ends provided with angular deflecting flanges, an angle nozzle in the casing connected to the oil inlet pipe for directing the oil against the flanges and to cause the oil to circulate around and between the baffle plates to precipitate the impurities therefrom into the casing before the oil passes through the outlet pipe.

2. An oil cleanser and purifier comprising a casing having an outwardly rounded top and an outwardly rounded bottom, a series of radially disposed baffle plates in the casing having their lower ends supported slightly above the bottom and their edges contacting with the casing, certain of said baffle plates being of a greater length than the others and contacting with the top of the casing and certain of said longer baffle plates having angle deflector flanges at the upper edges thereof, and an angle nozzle in the casing connected with the oil inlet pipe for directing the oil against the said deflector flanges to create a circular movement to the oil and to likewise cause the oil to pass between the baffle plates to precipitate the impurities therefrom before the oil finds an outlet through the casing.

3. An oil cleanser and purifier comprising a casing having an outwardly rounded top and an outwardly rounded bottom, a series of radially disposed baffle plates in the casing having their lower ends supported slightly above the bottom and their edges in contact with the casing, certain of said baffle plates being of a greater length than the others and contacting with the top of the casing and certain of said longer baffle plates having angle deflector flanges at the upper edges thereof, an angle nozzle in the casing connected with the oil inlet pipe for directing the oil against the said deflector flanges to create a circular movement to the oil and to likewise cause the oil to pass between the baffle plates to precipitate the impurities therefrom before the oil finds an outlet through the casing and a drain cock on the bottom of the casing.

In testimony whereof I affix my signature.

JOHN L. GREEN.